(12) United States Patent
Gomez Martinez et al.

(10) Patent No.: US 10,742,452 B2
(45) Date of Patent: Aug. 11, 2020

(54) NOISE REDUCTION BETWEEN PROXIMATE NETWORKS

(71) Applicant: Lantiq Deutschland GmbH, Neubiberg (DE)

(72) Inventors: Feliciano Gomez Martinez, San Jose, CA (US); Joon Bae Kim, Lexington, NJ (US); Khashayar Mirfakhraei, Los Altos, CA (US); Imran Hajimusa, San Jose, CA (US)

(73) Assignee: Lantiq Beteiligungs GmbH & Co. KG, Neubiberg (DE)

( * ) Notice: Subject to any disclaimer, the term of this patent is extended or adjusted under 35 U.S.C. 154(b) by 0 days.

(21) Appl. No.: 13/924,616

(22) Filed: Jun. 23, 2013

(65) Prior Publication Data

US 2013/0279552 A1    Oct. 24, 2013

Related U.S. Application Data

(63) Continuation of application No. PCT/EP2011/006468, filed on Dec. 21, 2011.

(60) Provisional application No. 61/427,093, filed on Dec. 23, 2010.

(51) Int. Cl.
*H04L 25/03* (2006.01)
*H04B 3/54* (2006.01)

(52) U.S. Cl.
CPC .............. *H04L 25/03* (2013.01); *H04B 3/54* (2013.01); *H04B 2203/5458* (2013.01); *H04B 2203/5495* (2013.01)

(58) Field of Classification Search
CPC ....... H04L 1/00; H04L 1/0033; H04L 1/0036; H04L 1/20; H04B 3/54

USPC .................. 375/219; 370/257, 331, 338, 401
See application file for complete search history.

(56) References Cited

U.S. PATENT DOCUMENTS

| | | | |
|---|---|---|---|
| 2002/0111144 A1* | 8/2002 | Schiff | H04W 52/12 455/69 |
| 2007/0002772 A1* | 1/2007 | Berkman | H04B 3/54 370/257 |
| 2010/0111199 A1 | 5/2010 | Sharma | |
| 2011/0080937 A1* | 4/2011 | Kim | H04L 5/0007 375/219 |
| 2012/0026908 A1* | 2/2012 | Tzannes | H04L 41/12 370/252 |
| 2013/0170629 A1* | 7/2013 | Flowers | H04M 3/306 379/23 |
| 2013/0188670 A1* | 7/2013 | Sun | H04B 3/58 375/211 |
| 2013/0188673 A1* | 7/2013 | Sun | H04B 1/401 375/219 |

FOREIGN PATENT DOCUMENTS

| | | |
|---|---|---|
| WO | 1999/003209 A2 | 1/1999 |
| WO | 2005/057834 A2 | 6/2005 |

* cited by examiner

*Primary Examiner* — Patrick N Edouard
*Assistant Examiner* — Eboni N Giles
(74) *Attorney, Agent, or Firm* — 2SPL Patent Attorneys (57) ABSTRACT

Representative implementations of devices and techniques provide noise reduction between proximate networks by minimizing interference from nearby network communication. A processing module determines a performance condition of a network and communicates with one or more nodes at a nearby network based on the performance condition of the network.

17 Claims, 5 Drawing Sheets

NOISE REDUCTION BETWEEN PROXIMATE NETWORKS

RELATED APPLICATIONS

This application is a bypass Continuation Application of PCT Application Number PCT/EP2011/006468, filed on Dec. 21, 2011. The PCT Application claimed benefit of U.S. Provisional Application No. 61/427,093, which was filed on Dec. 23, 2010. Priority of the PCT and Provisional Applications are hereby claimed and the entire contents of the Applications are incorporated herein by reference.

BACKGROUND

When communication networks operate in close proximity to each other, there is a chance that the networks will interfere with each other. Some networks may use a communication medium that is poorly shielded, if shielded at all. In a power line communication (PLC) system, for example, the power conductors used as a communication medium are generally not well shielded. Consequently, noise from the power line communication system may be coupled to other networks in close proximity. Further, a nearby network, a digital subscriber line (xDSL) network for example, may not have a mechanism that can handle the coupled noise, making the network more prone to error.

Ad hoc solutions have been proposed that manually address interference problems between proximate networks. Portions of one or more of the networks may be re-routed, additional shielding may be applied, or other modifications may be made to individually address noise issues. However, such solutions generally do not scale well to larger deployments and often require retrofitting an existing installation (e.g., existing facility power lines). Further, there may be limitations to the modifications that can be made to a site based on physical restrictions or performance specifications.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Representative implementations of devices and techniques provide noise reduction between proximate networks by minimizing, if not eliminating, interference from nearby network transmissions. In an implementation, a processing module determines a performance condition of a first network and communicates with one or more nodes at a nearby network based on the performance condition of the first network. For example, the processing module can automatically determine a level of noise at the first network that is attributable to a node of the nearby network, and can send instructions to the node at the nearby network directing it to adjust a power output at the node to minimize the noise interference at the first network.

In some implementations, the nearby networks are separate in terms of communication medium and/or communication technology type. In one implementation, the processing module may be included in an apparatus that is coupled to each of the nearby networks. The apparatus may also comprise multiple transceivers, and be configured to communicate via each of the discrete networks.

Various implementations for minimizing interference from proximate networks, including techniques and devices, are discussed with reference to the figures. The techniques and devices discussed may be applied to any of various network designs, circuits, and devices and remain within the scope of the disclosure.

Implementations are explained in more detail below using a plurality of examples. Although various implementations and examples are discussed here and below, further implementations and examples may be possible by combining the features and elements of individual implementations and examples.

In a first aspect, the invention encompasses a method comprising determining, at a processing module coupled to a first network and a second network, a level of noise at the first network attributable to a node associated with the second network. The method further comprises sending a communication from the processing module to the node directing the node to adjust a power output at the node based on the level of noise determined.

In an embodiment according the invention in the first aspect the method comprises computing an adjustment to the power output at the node calculated to meet a performance target at the first network.

In an embodiment according the invention in the first aspect the method comprises directing the node to adjust the power output at the node to a value resulting in a level of noise at the first network that is less than a preselected threshold.

In an embodiment according the invention in the first aspect the method comprises receiving information from the second network and sending a communication from the processing module to the node directing the node to adjust a power output at the node based on a performance target at the second network.

In an embodiment according the invention in the first aspect the method comprises determining, at the processing module, a level of noise at the first network attributable to each of a plurality of nodes associated with the second network and sending a communication to each respective node of the plurality of nodes to directg the respective node to adjust a power output at the respective node based on a level of noise attributed to the respective node.

In an embodiment according the invention in the first aspect the method comprises directing the node to transmit a test communication for noise measurement.

In an embodiment according the invention in the first aspect the method comprises receiving a notification from the node. The notification includes at least one of a start time and a duration for the test communication.

In an embodiment according the invention in the first aspect the method comprises scheduling the test communication to coincide with a preselected type of transmission at the first network.

In an embodiment according the invention in the first aspect the method comprises directing another node at the first network to collect performance statistics during the test communication.

In a second aspect, the invention encompasses an apparatus comprising a first transceiver, a second transceiver and a processor. The first transceiver is arranged to communicate at least in part via a first network using a first communication medium. The second transceiver is arranged to communicate at least in part via a second network using a second communication medium. The processor is coupled to the first transceiver and the second transceiver. The processor is arranged to determine a level of noise at the first network attributable to the second transceiver and to direct the second transceiver to adjust a power output at the second transceiver based on the level of noise.

In an embodiment according the invention in the second aspect the apparatus further comprises a memory storage device arranged to store performance data received from at least one of the first transceiver and the second transceiver. The processor is adapted to analyze the performance data to determine the level of noise at the first network attributable to the second transceiver.

In an embodiment according the invention in the second aspect the processor is arranged to determine a level of noise at the first network attributable to a third node associated with the second network and to direct the third node to adjust a power output at the third node based on the level of noise.

In an embodiment according the invention in the second aspect the second transceiver is arranged to send a communication to a third transceiver associated with the second network. At least one effect of the communication is to direct the third transceiver to adjust a power output at the third transceiver based on the level of noise at the first network.

In an embodiment according the invention in the second aspect the processor is arranged to direct the second transceiver to refrain from transmitting for a defined duration.

In an embodiment according the invention in the second aspect the first transceiver comprises a digital subscriber line (xDSL) transceiver.

In an embodiment according the invention in the second aspect the second transceiver comprises a power line carrier (PLC) transceiver.

In an embodiment according the invention in the second aspect the apparatus is adapted to perform the method according to the invention in the first aspect.

In a third aspect, the invention encompasses a system comprising a plurality of transceivers a processor. The processor is coupled to the transceivers and arranged to receive performance statistics from one or more of the plurality of transceivers. The processor is further adapted to send instructions to the plurality of transceivers based on the received performance statistics.

In an embodiment according the invention in the third aspect one or more of the plurality of transceivers is adapted to communicate via a first communication network. Another of the plurality of transceivers is configured to communicate via a discrete second communication network.

In an embodiment according the invention in the third aspect the one or more of the plurality of transceivers comprises a digital subscriber line (xDSL) transceiver.

In an embodiment according the invention in the third aspect the other of the plurality of transceivers comprises a power line carrier (PLC) transceiver.

In an embodiment according the invention in the third aspect the processor determines a level of noise at a network attributable to one or more of the plurality of transceivers and directs the one or more of the plurality of transceivers to adjust a power output at the one or more of the plurality of transceivers based on the level of noise.

In an embodiment according the invention in the third aspect at least one of the plurality of transceivers comprises an Orthogonal Frequency Division Multiplexing (OFDM) multicarrier apparatus including a transceiver and a controller.

In an embodiment according the invention in the third aspect at least one of the plurality of transceivers is arranged to communicate via multicarrier symbols including tones or sub-channels, the tones or sub-channels having data bits modulated thereon.

Example System

Figure 1:
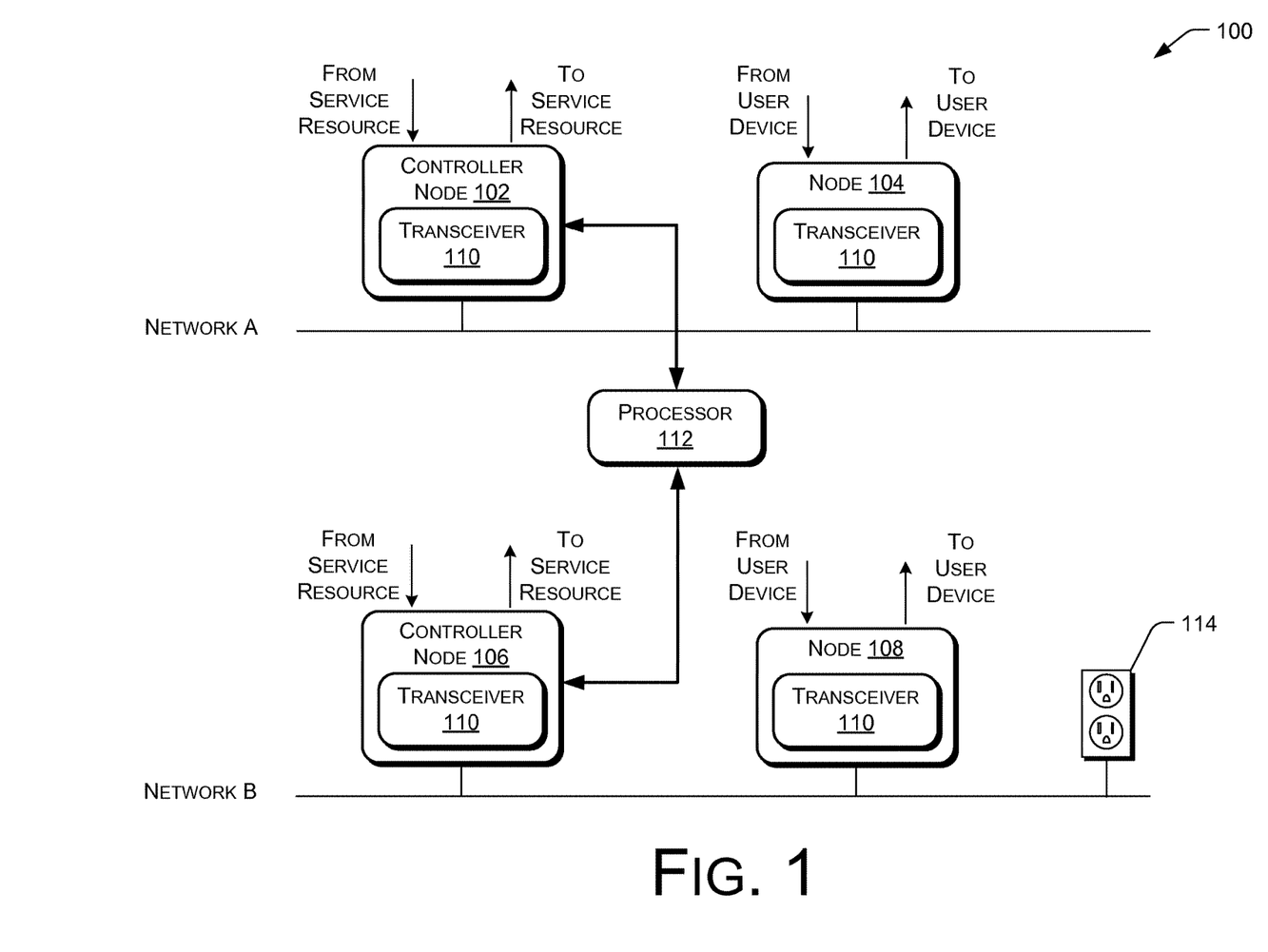
FIG. 1 is schematic of an example communication arrangement or system in which the techniques in accordance with the present disclosure may be implemented.

In one implementation, as shown in FIG. 1, an example system 100 comprises at least two discrete communication networks (network A and network B). In various examples, network A is comprised of a first communication medium and network B is comprised of a second discrete communication medium. One or more nodes (102, 104, 106, and 108) are associated with each of the networks A and B. While system 100 is illustrated in FIG. 1 as having two networks with two nodes each, this is not intended as a limitation, and is for convenience of discussion. In various implementations, a system 100 may include two or more networks, each network having any number of nodes.

The example system 100 is described as representing a digital subscriber line (xDSL) network (network A) and a power line carrier (PLC) network (network B) for convenience of discussion. The disclosed techniques and devices apply to any of various networks, wired and/or wireless, where a network is in a proximity to one or more other networks and receives interference and/or noise based on the operation of the other network(s). Without loss of generality, xDSL and PLC systems are discussed hereafter for the purpose of illustration.

In one implementation, one or more of the nodes 102-108 may include a multicarrier apparatus, transmitter, receiver, transceiver, modem, or the like, (generically referred to herein as a "transceiver 110") for communication on a communication channel via its associated network. The communication channel may be realized as a wireless communication medium, a wireline communication medium (e.g., coaxial cable, twisted pair of copper wires, power line wiring, optical fiber, etc.), or combinations thereof. In the illustrated example of FIG. 1, the nodes 102 and 104 are arranged to communicate at least in part via network A and the nodes 106 and 108 are arranged to communicate at least in part via network B. Accordingly, the nodes 102-108 may include structure and functionality that enable signal communication over the networks A and B. Such structure and functionality may include one or more antennas, integrated wire line interfaces, and the like. Depending on the implementation, the nodes 102-108 may communicate with other nodes on the respective network directly (peer-to-peer mode) or the nodes 102-108 may communicate via a controller node 102, 106. In one implementation, one or more of the nodes 102-108 are Orthogonal Frequency Division Multiplexing (OFDM) apparatuses capable of implementing the herein described implementations. For example, the nodes 102-108 may include a transceiver and/or a controller, as is discussed below.

In various implementations, noise interference may be coupled from one network to another network (e.g., network A to network B and/or network B to network A) based on the transmissions of one or more of the transceivers 110 of nodes 102-108 during operation. For example, node 106 may communicate with node 108 on network B, and noise interference due to the transmissions of node 106 and/or node 108 may be coupled onto network A, based on the proximity of the networks.

As shown in FIG. 1, an example system 100 may include a processing module ("processor") 112 coupled to one or more of the transceivers 110 of nodes 102-108. If included, the processor 112 may receive performance statistics from one or more of the transceivers 110 and send instructions to the nodes 102-108 and/or transceivers 110 based on the received performance statistics. For example, in one implementation, the processor 112 determines a level of noise at network A that is attributable to a node 106 and/or 108 of network B, and sends instructions to the node 106 and/or 108 at network B directing the node 106 and/or 108 to adjust a power output at the node 106 and/or 108, to minimize the noise interference at network A. These functions and others are discussed further below.

As used herein, the term "processor 112" is meant generally to include a module that includes any of the types of digital processing devices including, without limitation, digital signal processors (DSPs), reduced instruction set computers (RISC), general-purpose (CISC) processors, microprocessors, gate arrays (e.g., FPGAs), programmable logic devices (PLDs), reconfigurable compute fabrics (RCFs), array processors, secure microprocessors, and application-specific integrated circuits (ASICs). Such digital processors may be contained on a single unitary IC die, or distributed across multiple components.

As shown in FIG. 1, at least some of the nodes 102-108 may be coupled to a network via one or more power outlets 114. For example, a node (102-108) may be "plugged in" to a wall socket (power outlet 114). Alternately or additionally, some of the nodes 102-108 may be hardwired to a network, or may be coupled in another manner allowing communication via the network (e.g., inductive coupling, optical coupling, wireless coupling, etc.).

As shown in FIG. 1, nodes 102-108 may also have connection to and/or from user devices, service resources, and the like. For example, a node (102-108) may be communicatively coupled to a user communications device, an automation console, a surveillance hub, a power usage monitoring and/or control interface, a service provider feed, a utility connection, and so forth.

In one implementation, one or more of the nodes 102-108 is a controller node 102, 106 (e.g., base station, master node, etc.) arranged to control communication of information with regard to a network. For example, a controller node 102, 106 may receive an entertainment feed from a service provider, and distribute content to other nodes on the network (such as nodes 104 and 108) as well as optionally provide for content consumption at the controller node 102, 106 itself. In one case, the controller node 102, 106 may control the type of content that is distributed to the other nodes 104 and 108, control the bandwidth used by the other nodes 104 and 108, and/or provide other control functions.

In one implementation, the system 100 may include a home network and one or more of the nodes 102-108 may be an access point of the home network. For example, in the implementation, a controller node (e.g., 102 and/or 106) may be a residential gateway that distributes broadband services to the other nodes (e.g., nodes 104 and/or 108). The nodes 102-108 may be associated with digital content destinations in the home, but may also be associated with digital content sources, such as digital video recorders (DVR), computers providing streaming video, televisions, entertainment centers, and the like.

Furthermore, one or more of the nodes 102-108 may be enabled to communicate using packet-based technology (e.g., ITU G.hn, HomePNA, HomePlug® AV and Multimedia over Coax Alliance (MoCA)) and xDSL technology). Such xDSL technology may include Asymmetric Digital Subscriber Line (ADSL), ADSL2, ADSL2+, Very high speed DSL (VDSL), VDSL2, G.Lite, and High bit rate Digital Subscriber Line (HDSL). In addition, the nodes 102-108 may be enabled to communicate using IEEE 802.11 and IEEE 802.16 (WiMAX) wireless technologies.

Exemplary implementations discussed herein may have various components collocated; however, it is to be appreciated that the various components of the system 100 may be located at distant portions of a distributed network, such as a communications network and/or the Internet, or within a dedicated secure, unsecured and/or encrypted arrangement. Thus, it should be appreciated that the components of the system 100 may be combined into one or more apparatuses, such as a modem, or collocated on a particular node of a distributed network, such as a telecommunications network. Moreover, it should be understood that the components of the described system 100 may be arranged at any location within a distributed network without affecting the operation of the system 100. For example, the various components can be located in a Central Office modem (CO, ATU-C, VTU-O), a Customer Premises modem (CPE, ATU-R, VTU-R), an xDSL management device, or some combination thereof. Similarly, one or more functional portions of the system 100 may be distributed between a modem and an associated computing device.

Example Apparatus

Figure 2:
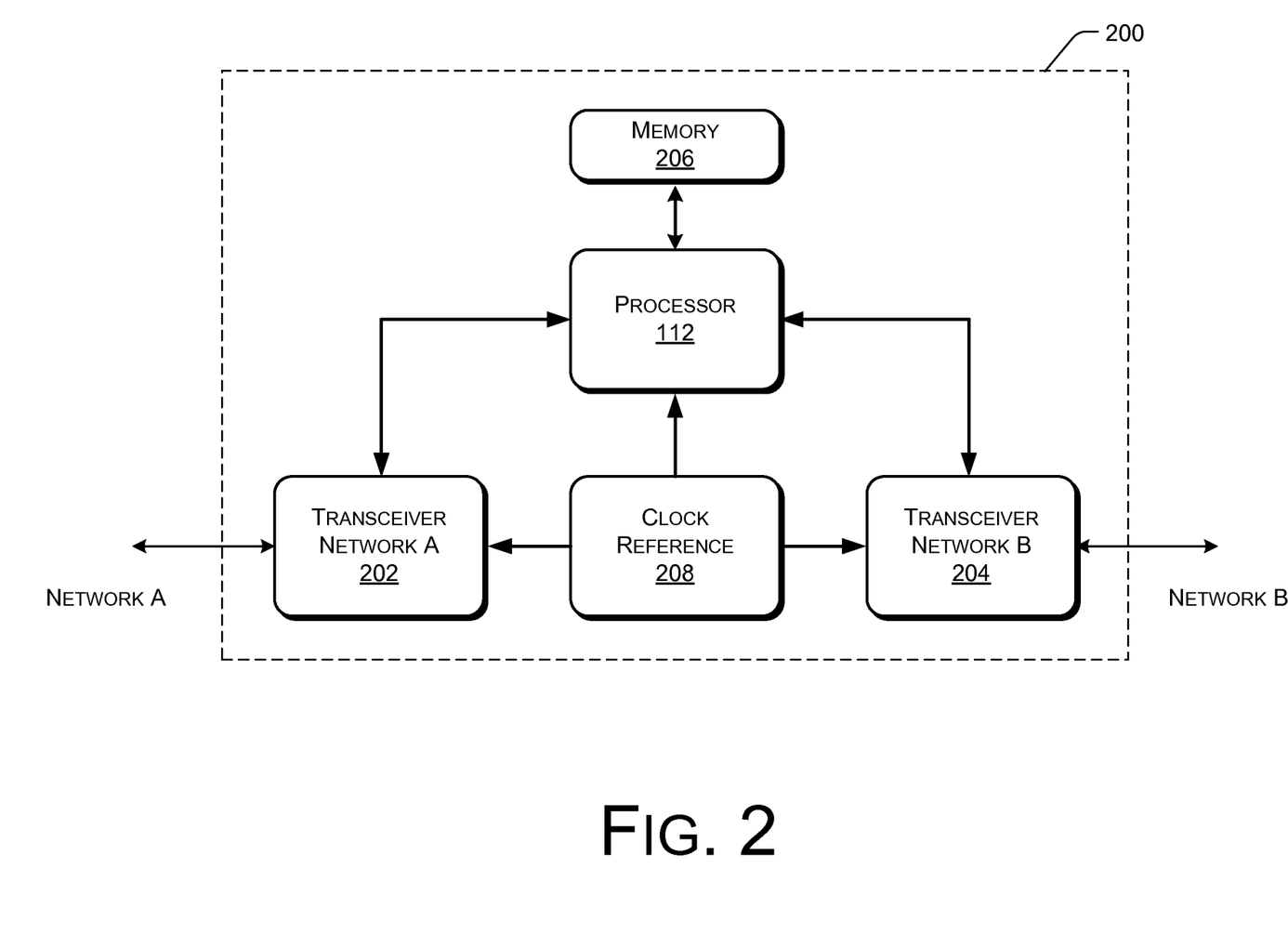
FIG. 2 is a block diagram illustrating an example apparatus that may be implemented in accordance with the present disclosure.

In one implementation, the processing module ("processor") 112 may be included in an apparatus or device that is coupled to one or more transceivers 110 associated with each of the nearby networks (e.g., network A and network B). In one implementation, as shown in FIG. 2, an apparatus 200 includes multiple transceivers 110 (e.g., transceivers 202 and 204) and a processor 112. The apparatus 200 may also include a memory 206 and a clock reference 208. In various implementations, an apparatus 200 may include fewer components, alternate components or additional components and remain within the scope of the disclosure. Further, all portions of the apparatus 200 may be collocated or an apparatus 200 may have distributed portions, for example.

Transceiver 202 is arranged to communicate primarily via one of the discrete networks (network A) using a first communication medium. Additionally, transceiver 204 is arranged to communicate primarily via another of the discrete networks (network B) using a second communication medium. In an implementation, the first medium of network A is distinctly different from the second medium of network B and network A and network B operate using disparate technologies. In one example, network A is an xDSL network operating on a twisted pair medium and transceiver 202 comprises an xDSL transceiver. In another example, network B is a PLC network operating on premises power lines and transceiver 204 comprises a PLC transceiver.

Figure 3:
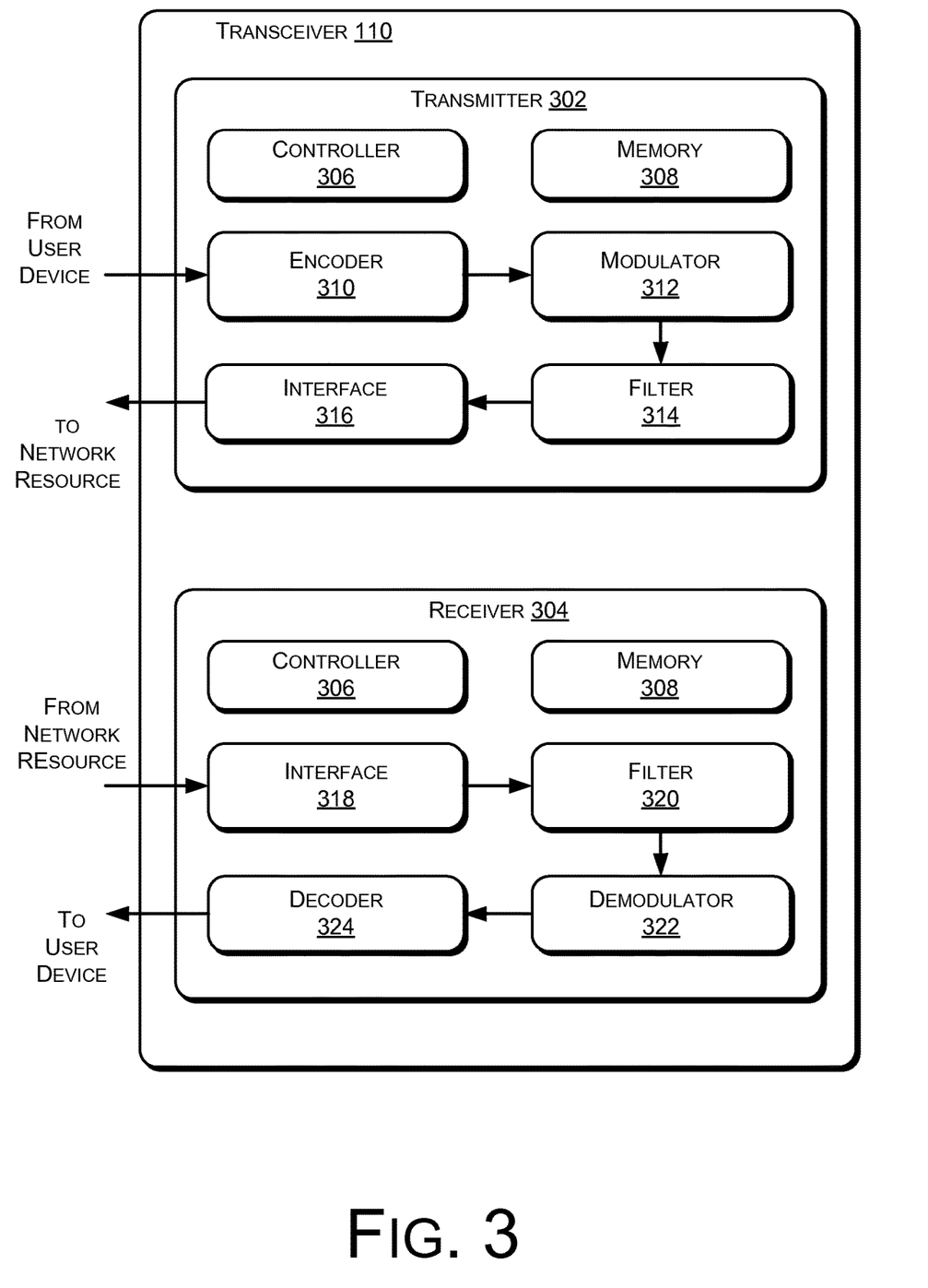
FIG. 3 is a block diagram illustrating an example of a transceiver apparatus implemented as part of the network of FIG. 1 or the apparatus of FIG. 2.

An exemplary transceiver 110 apparatus that may be used as a transmitting and receiving apparatus in a multicarrier arrangement or system 100 is illustrated in FIG. 3. The transceiver 110 may include a transmitter portion 302 and/or a receiver portion 304, where one or both of the portions may include a controller 306 and/or memory 308. In various implementations, a single controller 306 may be shared by the transmitter 302 and the receiver 304. Likewise, in some implementations, a single memory 308 may be shared by the transmitter 302 and the receiver 304, or alternately the memory 308 may be comprised of multiple memory devices distributed in one or more of the transceiver 110, the transmitter 302, and the receiver 304.

As used herein, the term "controller 306" is meant generally to include all types of digital processing devices as described with reference to the processor 112. If included, the controller 306 may direct the flow of information through the transceiver 110, may provide timing to the components of the transceiver 110, and the like.

If included, the memory 308 may store executable instructions, software, firmware, operating systems, applications, preselected values and constants, and the like, to be executed or used by the controller 306, for example. In various implementations, the memory 308 may include computer-readable media. Computer-readable media may include, for example, computer storage media. Computer storage media, such as memory 308 and memory 206, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device (such as the controller 306 or the processor 112). Although computer storage media (memory 308 and memory 206) is shown within the transceiver 110 and the apparatus 200 it will be appreciated that the memory 308 and/or the memory 206 may be distributed or located remotely and accessed via a network or other communication link.

As shown in FIG. 3, an example transmitter 302 may include an encoder 310, a modulator 312, a filter 316, and an interface 314. In alternate implementations, a transmitter 302 may include fewer components, alternate components, or additional components and remain within the scope of the disclosure.

In an implementation, signals exchanged between the nodes 102-108 by the transceivers 110 may include multi-carrier symbols that each includes a plurality of tones or sub-channels. Each of the tones within a multicarrier symbol may have data bits modulated thereon that are intended for delivery from one of the nodes 102-108 to another. In an implementation, the transmitter 302 is arranged to modulate the data bits onto the tones and transmit the signals including the tones via the network A and/or B.

If included, the encoder 310 is arranged to receive data (e.g., from a user device) for communication to a receiving device coupled to the transceiver 110 via a wireless or wire line medium 102. More specifically, the encoder 310 is arranged to translate incoming data bit streams into in-phase and quadrature components for the plurality of tones. The encoder 310 may be arranged to output a number of symbol sequences that are equal to the number of tones available to the system 100.

If included, the modulator 312 is arranged to receive symbol sequences (e.g., from the encoder 310) to produce a modulated signal in the form of a discrete multi-tone signal. The modulator may pass the modulated signal to the filter 314 (if the filter is included) to undergo various filtering. In one implementation, the filtered signal is passed to the interface 316 for communication over the medium 102 to a receiving device. For example, the interface 316 may facilitate communication of the modulated signal to a network resource such as an automation control center, a surveillance hub, and the like.

In various implementations, the transceiver 110 may also include a receiver 304 that is capable of receiving modulated multi-tone signals communicated over a network A and/or B from a transmitting device. As shown in FIG. 2, an example receiver 304 may include an interface 318, a filter 320, a demodulator 322, and a decoder 324. In alternate implementations, a receiver 304 may include fewer components, alternate components, or additional components and remain within the scope of the disclosure.

In one implementation, signals received by the receiver 304 may be passed to the filter 320 via the interface 318. The interface 318 may facilitate communication with a network resource, for example. After received signals undergo filtering by way of the filter 320 (if included), the filtered signals may be demodulated by the demodulator 322. The demodulated signals may be passed to and processed by the decoder 324.

If included, the decoder 324 produces data bit streams for consumption by a computing device, or the like. Effectively, the demodulator 322 and the decoder 324 perform the opposite functions of the modulator 312 and the encoder 310, respectively.

In various implementations, one or more of the controller 306, encoder 310, decoder 324, modulator 312, demodulator 322, interface 316 and/or 318, filter 314 and/or 320, as well other components, may be implemented in hardware, firmware, software, or the like, or in combinations thereof.

Referring back to FIGS. 1 and 2, the processor 112 of apparatus 200 is coupled to each of the transceivers 110 (e.g., 202 and 204). The processor 112 is arranged to determine a level of noise at one network (network A, for example) attributable to a transceiver (204, for example) associated with another network (network B, for example) and to direct the transceiver (204) to adjust a power output at the transceiver (204) based on the level of noise.

In an alternate implementation, the processor 112 is coupled to a plurality of transceivers 110 and communicates with multiple transceivers 110 when addressing noise on a network. In one example, the processor is arranged to determine a level of noise at the first network (network A) attributable to another node (e.g., node 108, for example) associated with the second network (network B) and direct the other node (108) to adjust a power output at the other node (108) based on the level of noise. Accordingly, in an implementation, the processor 112 can determine a source of noise from among a plurality of nodes and can communicate with the individual node(s) to direct an adjustment to the power output of the node.

In a further implementation, the processor 112 communicates with at least one node (e.g., 106) on a network (network B, for example), and the node (106) then passes the communication to one or more other nodes (e.g., 108) to address noise on a network. In one example, the processor 112 is arranged to communicate with at least one node (106) on a network (network B), and the node (106) is arranged to send a communication to another node (e.g., 108) associated with the network (network B), directing the other node (108) to adjust a power output at the transceiver 110 of the node (108) based on the level of noise at the first network (network A).

In alternate implementations, the processor 112 may send various communications to the transceivers 110 and/or the nodes 102-108. In one example, the processor 112 may direct a transceiver 110 to refrain from transmitting for a defined duration (e.g., for testing purposes, to capture a baseline noise level, to determine a noise source, etc.). In other examples, the processor 112 may direct a transceiver 110 to transmit a test tone, a symbol set for initialization and/or synchronization, and the like.

If included in apparatus 200, the memory 206 as shown in FIG. 2 may comprise a memory storage device such as a computer readable media as described above. the memory 206 may store executable instructions, software, firmware, operating systems, applications, preselected values and constants, and the like, to be executed or used by the processor 112, for example. Accordingly, when executed by the processor 112, the processor-accessible instructions may direct the processor 112 to perform functions related to the disclosed techniques of reducing noise interference between proximate networks.

In one implementation, the memory 206 is arranged to store performance data received from at least one of the transceivers 202 and/or 204. As will be discussed further, the processor 112 may analyze the performance data to determine a level of noise at one network that is attributable to a transceiver 110 on or associated with another network.

If included in apparatus 200, the clock reference 208 as shown in FIG. 2 may supply a timing signal to the processor 112 and the transceivers 110 (202 and 204), as well as other portions of the apparatus 200 and/or the system 100. The timing signal provided by the clock reference 208 may allow the transceivers 110 and/or other portions of the system 100 to be synchronized, when it is desired. For example, it may be desirable to time a particular communication on one network to take place during a time in which data (or important data) is not being communicated on another network.

Example Operations

Figure 4:
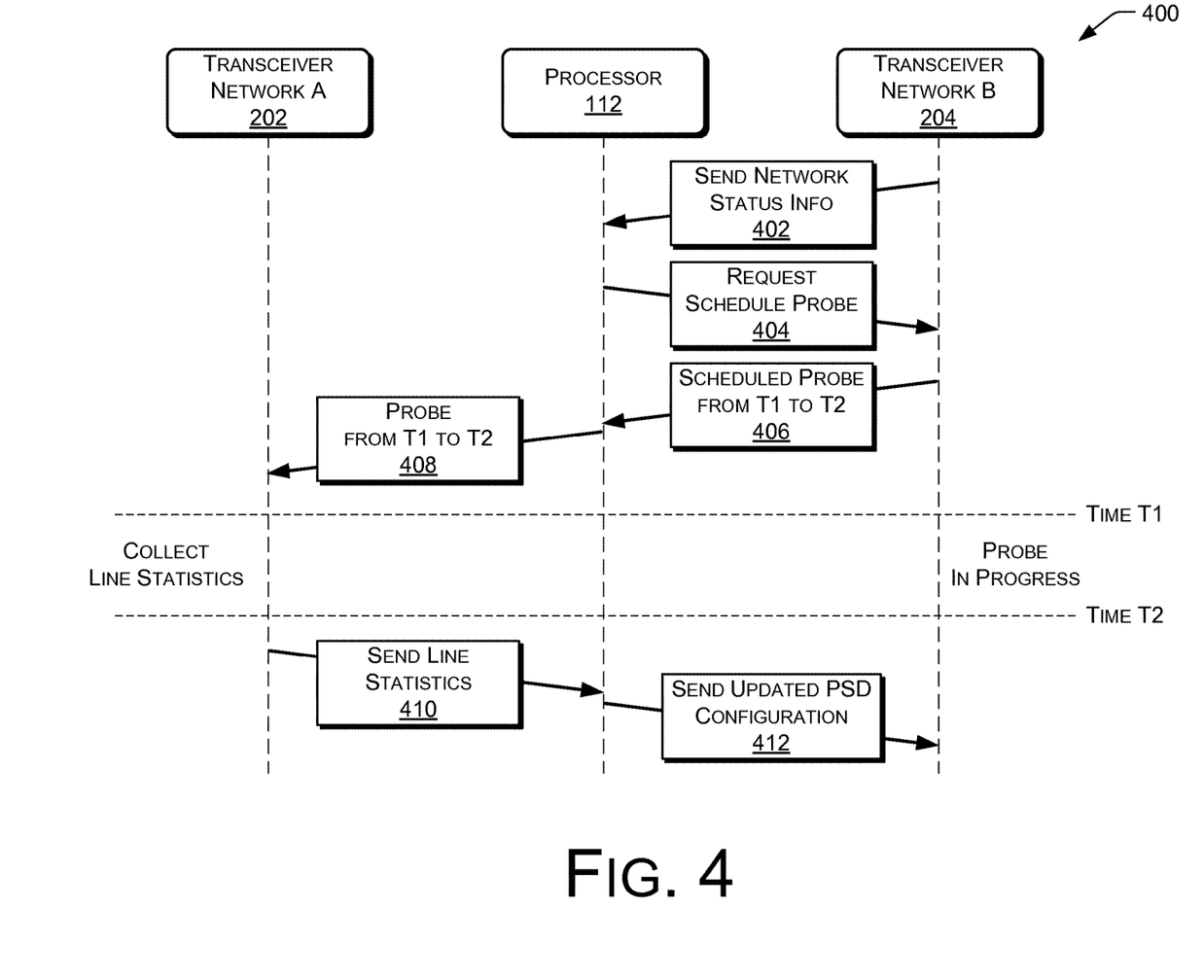
FIG. 4 is an illustration of an example process flow showing techniques for reducing noise interference between two example networks.

FIG. 4 is an illustration of an example process flow 400 showing techniques for reducing noise interference of two example networks, according to an implementation. The described techniques are illustrated in terms of two networks; however, the techniques may also be used with any number of multiple networks. The example process flow 400 may be performed on a system 100, automatically for example, as described above. In one example, as illustrated, a processor 112 is coupled to a transceiver 202 associated with network A, and is coupled to a transceiver 204 associated with network B.

In one example implementation, at 402, one or more transceivers (transceiver B 204, in this example) may periodically provide information to the processor 112 about the status of network B. In particular, transceiver B 204 may provide information about the number of nodes in the network B, and their unique identifiers (for example, home network (G.hn) 8-bit device identifications, or the equivalent information for other technologies).

At 404, the processor 112 may periodically send instructions to transceiver B 204 requesting that it schedule test transmissions (e.g., "probe frames") for interference measurement at specific nodes at network B. In some implementations, the processor 112 may alternately request that transceiver B 204 schedule "silence time slots" at transceiver B 204 and/or one or more of the nodes at network B.

At 406, transceiver B 204 schedules probe frames at network B. The schedule complies with the service requirements of network B (i.e., bandwidth reservations, etc.). Once the probes have been scheduled, transceiver B 204 may send a response back to the processor, providing information about the scheduled probe, including the start time, stop time, duration, and the like.

In one implementation, the time slots allocated for one or more transceivers at network B to transmit probe frames may be aligned with network A transmissions (e.g., symbols) in which data is not carried (e.g., sync symbols, dummy symbols, symbols used in frame blanking, etc.) in order to minimize the interruption of service due to probes transmitted by transceivers at network B.

At 408, the processor instructs the transceiver A 202 to collect performance statistics during the periods in which the network B probes are expected. These performance statistics may include line noise (or interference), number of erroneous forward error correction (FEC) blocks, and the like. As shown in FIG. 4, during the time period from time T1 to time T2, the probe conducted by nodes at network B is in progress and one or more nodes at network A (including transceiver A 202, for example) collects network A line performance statistics (e.g., power ratio of signal strength to noise interference, etc.).

At 410, transceiver A 202 sends the collected performance statistics to the processor 112.

At 412, the processor 112 computes an amount in which the power spectrum density (PSD) (i.e., power output) of one or more nodes at network B is to be adjusted, based on the performance statistics collected about network A. For example, the processor 112 may compute a reduction of power output at one or more nodes of network B to reach a specific performance target at network A. The processor 112 may also consider physical (PHY)-layer information from network B in order to maximize end-to-end performance at network B (i.e., maintaining a preselected minimum level of power output at network B, and allowing some interference at network A, in order to get better performance at network B).

At 412 the processor 112 sends the computed power adjustment levels to transceiver B 204 and/or other nodes at network B. In one implementation, the PSD value might be in vector form (e.g., having different values for different frequencies, having different values for a tone or a group of tones, having different values for a given set of frequencies (tones) which can be interpolated to create a PSD, having one value for each network A downstream band, having one value for all bands, and the like.) In one implementation, transceiver B 204 may send specific control messages to other remote nodes at network B directing the other nodes to adopt the power output levels computed by the processor 112.

Alternately, transceiver A 202 may collect performance statistics either during normal operational mode (as described in process flow blocks 402-412 above) or during loop diagnostic mode. One example of collecting performance statistics during diagnostic mode is illustrated as follows.

Upon receiving instructions from the processor 112, transceiver A 202 enters the loop diagnostic operational mode. This mode enables automatic measurement of network A channel conditions at both ends of the loop without dispatching maintenance technicians to attach test equipment to the loop. The resulting information helps to isolate the location and the sources of any interference or impairment (crosstalk, radio frequency interference, bridged taps, etc.).

During the channel discovery phase of the loop diagnostic mode, transceiver A 202 collects Quiet Line Noise (QLN) data, which includes the noise present in the Down Stream (DS) channel of the network A loop, in the absence of any network A signals exchanged either upstream or downstream. In one example, with each instruction of the processor 112, the transceiver A 202 will enter the diagnostic mode and collect the crosstalk noise due to a single network B transmitter source, extract the frequency components of the noise within a preselected subcarrier spacing (e.g., 4.325 Khz, for example) up to a preselected bandwidth (e.g., 30 MHZ, for example), and pass it through any messaging scheme to the processor 112 for further storage (in memory 206, for example) and analysis.

The diagnostic loop procedure may be repeated for each node 106-108 or transmitter 110, 204 connected to the network B medium to capture the frequency profiles of the crosstalk noise at the network A loop that may be attributed to the transmitter B 204. Alternately, the diagnostic loop procedure may be repeated for each node 102-104 or transmitter 110, 202 connected to the network A medium to capture the frequency profiles of the crosstalk noise at the network B loop that may be attributed to the transmitter A 202. The data may then be passed to the processor 112 to be stored within internal or external memory 206 for further processing and analysis.

In alternate implementations, one or more of the above techniques may be employed concurrently, or another technique may be used to accomplish the same or similar results. The implementations herein are described in terms of exemplary embodiments. However, it should be appreciated that individual aspects of the implantations may be separately claimed and one or more of the features of the various embodiments may be combined.

Representative Processes

Figure 5:
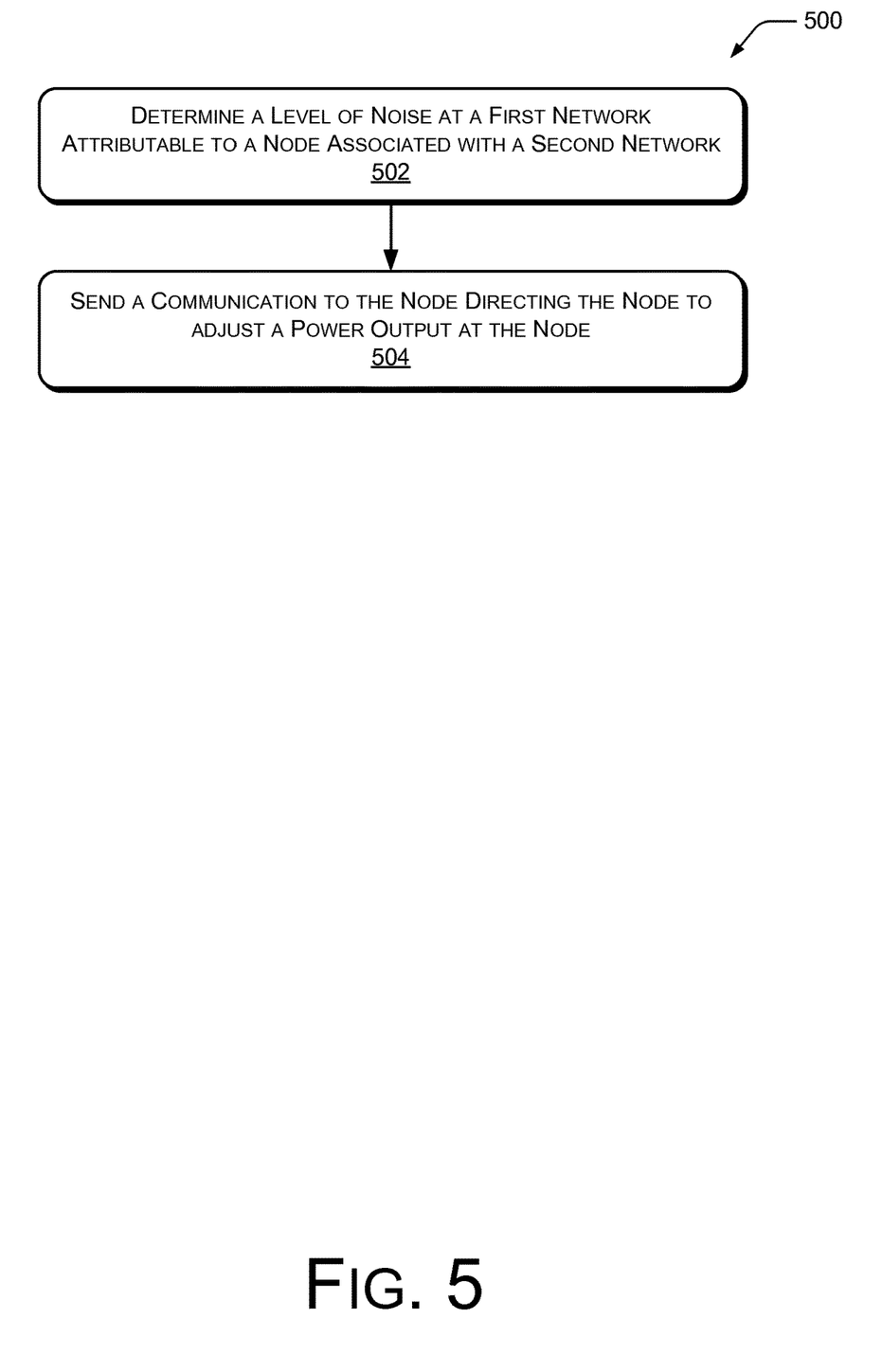
FIG. 5 is a flow diagram illustrating an example process of reducing noise interference between proximate networks, according to an implementation.

FIG. 5 illustrates a representative process 500 for reducing noise interference of multiple nearby networks, according to an implementation. An example process 500 may be performed on a system 100, automatically for example, as described above. In one example, a processing module (such as processor 112, for example) is coupled to a plurality of transceivers (such as transceivers 110, for example). In an implementation, the transceivers 110 are arranged to communicate at least in part via one of two or more discrete networks. The process 500 is described with reference to FIGS. 1-4.

At block 502, the process includes determining, at a module (such as processor 112) coupled to a first network (such as network A) and a second network (such as network B), a level of noise at the first network attributable to a node (such as nodes 106-108) associated with the second network.

At block 504, the process includes sending a communication from the module to the node directing the node to adjust a power output at the node based on the level of noise determined. For example, the communication from the module may direct the node to reduce, increase, or maintain a current power output level at the node. In one example, the power output at the node is referred to as the power spectrum density (PSD).

In an implementation, the process includes computing an adjustment to the power output at the node calculated to meet a performance target at the first network. For example, the module can compute the amount in which the power output of one or more node(s) at the second network is to be reduced in order to reach a specific performance target at the first network. In one implementation, the module can compute a power adjustment value for a node after a preselected number of other nodes have been computed and adjusted.

In another implementation, the process includes directing the node to adjust the power output at the node to a value resulting in a level of noise at the first network that is less than a preselected threshold. For example, the preselected threshold may be measured in terms of a signal to noise ratio.

In another implementation, the process includes receiving information from the second network at the module. In various implementations, the information received may include test data, performance statistics, physical attributes, settings, and the like. The module then sends a communication to the node directing the node to adjust a power output at the node based on a performance target at the second network. For example, the module may consider physical (PHY)-layer information from the second network in order to maximize end-to-end performance (i.e., allow some non-zero interference at the first network in order to get better performance at the second network).

In another implementation, the process includes determining, at the module, a level of noise at the first network attributable to each of a plurality of nodes associated with the second network. The module then sends a communication to each respective node of the plurality of nodes directing the respective node to adjust a power output at the respective node based on a level of noise attributed to the respective node. Thus, each node of the plurality of nodes may make a unique adjustment to its power output depending on the contribution of the node to the overall noise at the first network.

In various implementations, the process may include the module collecting performance data and directing adjustments to the power output of one or more nodes/transceivers based on normal network operation or during a diagnostic test routine. In one implementation, the process includes directing the node to transmit a test communication for noise measurement. In one example, the module may receive a notification from the node acknowledging the direction to transmit the test communication. The notification may include other information including: a start time, a stop time, and/or a duration for the test communication. Accordingly, the module may direct another node at the first network to collect performance statistics during the test communication.

In an alternate implementation, the process may include scheduling the test communication to coincide with a preselected type of transmission at the first network. For example, the module may direct the test communication to be conducted during a period of delay, or of less important communication transmissions, or during transmission of more noise tolerant communication, or the like. Alternately, the module may direct the test communication to be conducted during a known baseline transmission, or the like.

The order in which the process 500 is described is not intended to be construed as a limitation, and any number of the described process blocks can be combined in any order to implement the process, or an alternate process. Additionally, individual blocks may be deleted from the process without departing from the spirit and scope of the subject matter described herein. Furthermore, the process can be implemented in any suitable hardware, software, firmware, or a combination thereof, without departing from the scope of the subject matter described herein.

In alternate implementations, other techniques may be included in the process 500 in various combinations, and remain within the scope of the disclosure.

The above-described arrangements, apparatuses and methods may be implemented in a software module, a software and/or hardware testing module, a telecommunications test device, a DSL modem, an ADSL modem, an xDSL modem, a VDSL modem, a linecard, a G.hn transceiver, a MOCA transceiver, a Homeplug transceiver, a powerline modem, a wired or wireless modem, test equipment, a multicarrier transceiver, a wired and/or wireless wide/local area network system, a satellite communication system, network-based communication systems, such as an IP, Ethernet or ATM system, a modem equipped with diagnostic capabilities, or the like, or on a separate programmed general purpose computer having a communications device or in conjunction with any of the following communications protocols: CDSL, ADSL2, ADSL2+, VDSL1, VDSL2, HDSL, DSL Lite, IDSL, RADSL, SDSL, UDSL, MOCA, G.hn, Homeplug or the like.

Additionally, the arrangements, procedures and protocols of the described implementations may be implemented on a special purpose computer, a programmed microprocessor or microcontroller and peripheral integrated circuit element(s), an ASIC or other integrated circuit, a digital signal processor, a flashable device, a hard-wired electronic or logic circuit such as discrete element circuit, a programmable logic device such as PLD, PLA, FPGA, PAL, a modem, a transmitter/receiver, any comparable device, or the like. In general, any apparatus capable of implementing a state machine that is in turn capable of implementing the methodology described and illustrated herein may be used to implement the various communication methods, protocols and techniques according to the implementations.

Furthermore, the disclosed procedures may be readily implemented in software using object or object-oriented software development environments that provide portable source code that can be used on a variety of computer or workstation platforms. Alternatively, the disclosed arrangements may be implemented partially or fully in hardware using standard logic circuits or VLSI design. The communication arrangements, procedures and protocols described and illustrated herein may be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed procedures may be readily implemented in software that can be stored on a computer-readable storage medium (such as memory 308), executed on programmed general-purpose computer with the cooperation of a controller (such as controller 306) and memory 308, a special purpose computer, a microprocessor, or the like. In these instances, the arrangements and procedures of the described implementations may be implemented as program embedded on personal computer such as an applet, JAVA® or CGI script, as a resource residing on a server or computer workstation, as a routine embedded in a dedicated communication arrangement or arrangement component, or the like. The arrangements may also be implemented by physically incorporating the arrangements and/or procedures into a software and/or hardware system, such as the hardware and software systems of a test/modeling device.

CONCLUSION

Although the implementations of the disclosure have been described in language specific to structural features and/or methodological acts, it is to be understood that the implementations are not necessarily limited to the specific features or acts described. Rather, the specific features and acts are disclosed as representative forms of implementing the invention.

What is claimed is:

1. An apparatus, comprising:
   a first transceiver arranged to communicate at least in part via a first network using a first communication medium;
   a second transceiver different from the first transceiver arranged to communicate at least in part via a second network different from the first network using a second communication medium different from the first communication medium; and
   a processor coupled to the first transceiver and the second transceiver, the processor arranged to determine a level of noise at the first network attributable to the second transceiver by transmitting probe signals in the second network aligned with non-data-carrying transmissions in the first network and coupled from the second network into the first network and to direct the second transceiver to adjust a power output at the second transceiver based on the level of noise.

2. The apparatus of claim 1, further comprising a memory storage device arranged to store performance data received from at least one of the first transceiver and the second transceiver; and
   wherein the processor analyzes the performance data to determine the level of noise at the first network attributable to the second transceiver.

3. The apparatus of claim 1, wherein the processor is arranged to determine a level of noise at the first network attributable to another node associated with the second network and direct the other node to adjust a power output at the other node based on the level of noise.

4. The apparatus of claim 1, wherein the second transceiver is arranged to send a communication to another transceiver associated with the second network, the communication directing the other transceiver to adjust a power output at the other transceiver based on the level of noise at the first network.

5. The apparatus of claim 1, wherein the processor is arranged to direct the second transceiver to refrain from transmitting for a defined duration.

6. The apparatus of claim 1, wherein the first transceiver comprises a digital subscriber line (xDSL) transceiver.

7. The apparatus of claim 6, wherein the second transceiver comprises a power line carrier (PLC) transceiver.

8. A method, comprising:
   determining, at a processing module coupled to a first network and a second network, the second network being different from the first network, a level of noise at the first network attributable to a node communicating at least in part via the second network and coupled from the second network into the first network by transmitting probe signals in the second network aligned with non-data-carrying transmissions in the first network, the first and second networks communicating via different communication media, sending a communication from the processing module to the node directing the node to adjust a power output at the node based on the level of noise determined.

9. The method of claim 8, further comprising computing an adjustment to the power output at the node calculated to meet a performance target at the first network.

10. The method of claim 8, further comprising directing the node to adjust the power output at the node to a value resulting in a level of noise at the first network that is less than a preselected threshold.

11. The method of claim 8, further comprising receiving information from the second network; and sending a communication from the processing module to the node directing the node to adjust a power output at the node based on a performance target at the second network.

12. The method of claim 8, further comprising determining, at the processing module, a level of noise at the first network attributable to each of a plurality of nodes associated with the second network; and sending a communication to each respective node of the plurality of nodes directing the respective node to adjust a power output at the respective node based on a level of noise attributed to the respective node.

13. The method of claim 8, further comprising directing the node to transmit a test communication for noise measurement.

14. The method of claim 13, further comprising receiving a notification from the node, the notification including at least one of a start time and a duration for the test communication.

15. The method of claim 13, further comprising scheduling the test communication to coincide with a preselected type of transmission at the first network.

16. The method of claim 13, further comprising directing another node at the first network to collect performance statistics during the test communication.

17. The method of claim 8, wherein the first network comprises a digital subscriber line (xDSL) network, and wherein the second network comprises a power line network.

\* \* \* \* \*